April 6, 1965  R. M. WILSON  3,176,707
FLOAT VALVE ASSEMBLY
Filed March 21, 1961
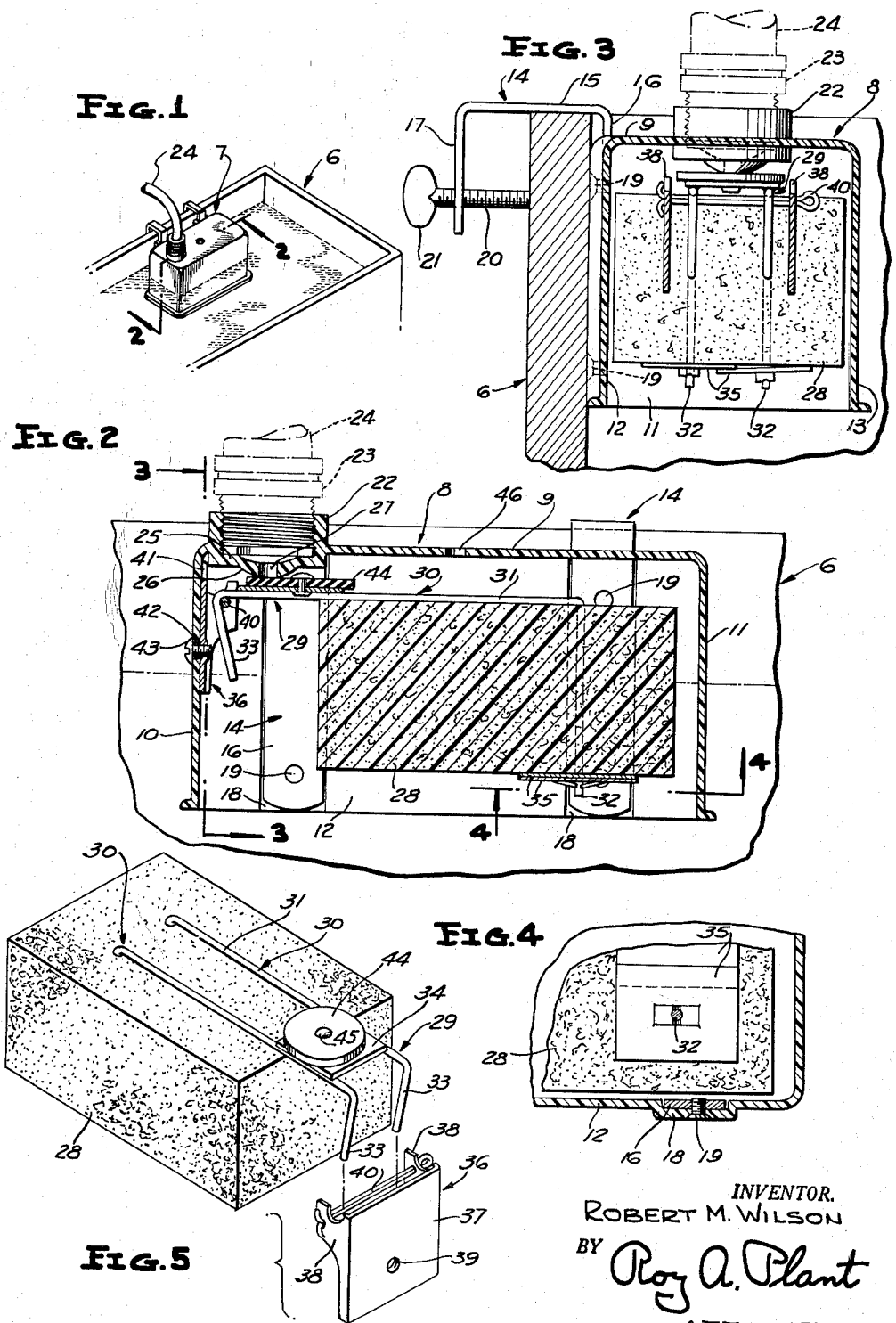
INVENTOR.
ROBERT M. WILSON
BY Roy A. Plant
ATTORNEY

# United States Patent Office 3,176,707
Patented Apr. 6, 1965

3,176,707
FLOAT VALVE ASSEMBLY
Robert M. Wilson, Battle Creek, Mich., assignor to Dare Products, Incorporated, Battle Creek, Mich., a corporation of Michigan
Filed Mar. 21, 1961, Ser. No. 97,314
10 Claims. (Cl. 137—315)

This invention relates in general to new and useful improvements in valve construction, and more specifically to a novel float valve assembly for use in animal watering troughs.

Many forms of float valves have been produced in the past with the floats being unprotected. Such valves would be unsatisfactory for use in stock watering tanks since "nuzzling" by the stock would quickly damage the mechanism. Covered mechanisms have also been proposed but these have been expensive, generally non-shiftable from tank to tank, complex, or required rigid piping to supply water to same for water level control. It was the lack of a covered and completely satisfactory, low cost, simple and positive float valve assembly commercially available for use on stock watering tanks, which led to the conception and development of the present invention.

This invention is particularly related to a float valve of the type which may be readily clamped onto a side wall of an animal watering trough and to which a garden hose may be attached, the float valve operating automatically to prevent flow of water through the garden hose into the watering trough once the watering trough has reached a predetermined level. This invention also relates to a float valve which is entirely protected so that it cannot be operated or damaged by an animal drinking from the watering trough.

Accordingly among the objects of the present invention is the provision of a novel float valve for animal watering troughs which includes a suitable shield having an open bottom and in which a float and valve assembly is mounted, the valve assembly being disposed in the upper part of the shield and cooperating with a portion of the shield to prevent flow of water into a full trough, and the float being entirely mounted within the shield and being directly operable to effect the preventing of water flow when the trough is full.

Another object of this invention is to provide a novel float valve of the type wherein the float is enclosed within a shield, the shield being provided with an integral fitting for attachment of a water hose thereto, and a portion of the shield preferably being in the form of a valve seat which cooperates with a valve member carried by a float disposed entirely within the shield to control the flow of water into a watering tank through the shield, the float being mounted on a bracket which is disposed within the shield and which may be readily secured in place against movement by a single screw which passes through the shield.

Still another object of this invention is to provide a novel float valve of the type which includes a shield encasing a float to prevent accidental actuation of the float when the float valve is used in conjunction with an animal watering trough, the float and valve construction of the float valve being of an extremely simple construction so that it may be quickly and readily assembled, and at the same time, is fool-proof so as to prevent the accidental malfunctioning thereof.

A further object of this invention is to provide a novel manner of mounting a float in conjunction with a float valve of the type wherein the float is disposed within a shield to prevent accidental actuation of the float by animals drinking from an animal watering trough with which the float valve is used, the mounting for the float preferably including a stainless steel bracket which is non-corrosive and may be readily secured to an inner surface of a wall of the shield by means of a single screw, and the stainless steel bracket having a single transverse pivot rod about which a support for the float is free to pivot so as to preclude any possibility of binding of the float due to corrosion or other friction increasing factors normally found in float valves of this type.

A still further object of this invention is to provide an extremely simple support for a float of a float valve, the support being formed, for instance, of two pieces of wire which may be considered or called eagle claws, each piece of wire including a generally horizontal upper portion having an elongated depending leg at one end and a relatively short depending leg at the opposite end, each of the long depending legs of said wires being intended to be passed through a float element and having attached on the lower end thereof a retainer means bearing against the underside of the float element to rigidly secure the float element thereto, the two pieces of wire having the horizontal legs thereof secured together adjacent the short depending legs of same by means of a small metal plate which, in turn, carries a valve element for movement into and out of engagement with a valve seat by the float, as will be hereinafter described.

Still another object of this invention is to provide a novel shield for both supporting and protecting a float valve float and valve assembly, the shield having an opening in one end thereof for receiving a single screw through which a mounting bracket for the float and valve element may be mounted, and the inner surface of the shield being provided with locating members or tips which are upwardly positioned and against which the mounting bracket may be placed to assure proper alignment of the mounting bracket with the opening in the wall of the shield whereby the single screw may be readily passed through the opening in the shield and threaded into the mounting bracket.

Still further objects and advantages of the invention will appear as the description proceeds.

To the accomplishment of the foregoing and related ends, the invention, then, consists of the float valve means hereinafter fully described and particularly pointed out in the claims, the annexed drawing and the following description setting forth in detail certain means for carrying out the invention, such disclosed means illustrating, however, but one of the various ways in which the principle of the invention may be used.

In the annexed drawing:

FIGURE 1 is a fragmentary perspective view of an animal watering trough and shows mounted therein a float valve in accordance with the present invention.

FIGURE 2 is an enlarged fragmentary vertical sectional view taken along the line 2—2 of FIGURE 1, looking in the direction of the arrows, and shows certain of the details of the internal construction of the float valve.

FIGURE 3 is an enlarged fragmentary transverse vertical sectional view taken along the line 3—3 of FIGURE 2, looking in the direction of the arrows, and shows further the relationship of some of the specific details of the internal construction of the float valve, the view also showing the manner in which the float valve is mounted on the watering trough.

FIGURE 4 is an enlarged fragmentary horizontal sectional view taken along the line 4—4 of FIGURE 2, looking in the direction of the arrows, and shows the preferred simple manner in which the float may be secured to the lower end of the support wires therefor, the view also showing the manner in which legs of the mounting bracket for the float are recessed into a side wall of the casing.

FIGURE 5 is an enlarged exploded perspective view showing details of the float, the means for supporting the float including the mounting bracket therefor, and the valve element carried by the float support.

Reference is now made to the drawing in detail wherein there is illustrated in FIGURE 1 a watering trough for animals, the watering trough being generally referred to by the numeral 6. The watering trough 6 carries a float valve for maintaining the level of water therein when connected to a suitable source of water supply, the complete float valve being generally referred to by the numeral 7 and being the subject of this invention.

The float valve 7 includes a casing, generally referred to by the numeral 8, FIGURES 2 and 3, the casing 8 in its preferred embodiment being of a one-piece molded plastic construction, although it may be made from other suitable materials such as stainless steel, Monel metal, brass, aluminum, et cetera. The casing 8 includes a top wall 9, end walls 10 and 11, and side walls 12 and 13. The bottom of the casing 8 is preferably open as shown.

The valve 7 is preferably supported with respect to the watering trough 6 by means of a pair of brackets, generally referred to by the numeral 14. Each bracket 14 is of an inverted U-shape and includes a top leg 15, FIGURE 3, having at one end thereof an elongated depending leg 16 and at the opposite end thereof a relatively short depending leg 17.

Reference is now made to FIGURES 2 and 4 of the drawing, wherein it is shown that the side wall 12 of the casing 8 is provided with an outwardly extending channel forming portion 18 for each of the bracket legs 16. The top wall 9 of the casing 8 is provided with a slot (not shown) in alignment with each of the channel forming portions 18 so that the respective bracket leg 16 may extend down through the top wall 9 and into its associated channel forming portion to the position typically illustrated in FIGURES 2, 3 and 4. The casing 8 is rigidly secured to the legs 16 by means of screws 19 which are preferably of the countersunk head type and which are threaded into the legs 16. As is clearly shown in FIGURE 3, there are two screws 19 for each leg 16.

In the general practice of mounting the float valve 7 on the watering trough 6, the support brackets 14 are mounted in the manner illustrated in FIGURE 3, with the top legs 15 thereof resting upon the top of the wall of the watering trough 6. The brackets 14 are each clamped in place by means of a clamp screw 20 which may have a wing head 21, the clamp screw 20 extending through and being threaded in the lower portion of its respective depending leg 17. The clamp screw 20 bears against the outer surface of the watering trough 6 to maintain the mounting bracket 14 in place and to clamp the casing 8 against the inner surface of the watering trough 6. While the top leg 15 has been illustrated as being in engagement with the upper edge of the watering trough 6, it is to be understood that vertical adjustment of the float valve 7 can be obtained by vertically adjusting the mounting brackets 14 with respect to the watering trough 6.

As is best illustrated in FIGURE 2, the top wall 9 of the casing 8 preferably has molded as a part thereof, an internally threaded fitting 22. The fitting 22 is particularly adapted to have threaded thereinto a conventional fitting 23 of a garden hose 24. The fitting 23 and garden hose 24 are, of course, merely a conventional showing of any suitable connector which will join the assembly to a suitable source of water, the flow of which is to be controlled by the assembly as it flows into watering tank 6. The fitting 22 projects through the top wall 9 into the interior of the casing 8 and the lower end of the fitting 22 is closed by a wall 25. The wall 25 has a depending central portion 26 which functions as a valve seat and which has a water entrance opening 27 therethrough. Flow of water into the watering trough 6 is controlled by closing or opening the entrance opening 27 automatically in accordance with the level of water within the watering trough 6, as will be hereinafter explained.

In order to control the flow of water through the entrance opening 27, there is mounted within the casing 8 a float 28. This float 28 is preferably formed of a suitable cellular plastic material, for example, "Styrofoam" which cannot become waterlogged and is unfailing in operation. The float 28 is carried by a float support, which is referred to in general by the numeral 29, FIGURES 2, 3 and 5. The float support 29 includes a pair of wires 30 which are preferably identical in outline, and, if desired, may be formed of a suitable non-corrosive material, such as stainless steel. Each wire 30 includes an upper horizontal leg portion 31 which is provided at one end thereof with a long depending leg 32 and at the opposite end thereof with a short depending leg 33. The two wires 30 are secured together with the horizontal leg portions 31 thereof disposed in spaced parallel relation, by means of a thin metal plate 34, which, for convenience, may be of rectangular shape. The plate 34 is suitably secured to the horizontal leg portions 31 adjacent the short depending legs 33, such as by welding. It is preferred that the plate 34 also be formed of a non-corrosive metal.

In attaching the float 28 to the float support 29, the long depending legs 32 are passed through the float 28 adjacent one end thereof and with the horizontal leg portions 31 overlying the upper surface of the float 28 in centered relation. The float 28 is retained on the long depending legs 32 by means of suitable fastening plate elements 35 which are preferably of the type which bite into the legs 32 and firmly grip the same. The fastening plate elements 35 may be of any suitable size, and if wires 30 are closely spaced, may have overlapping edges, as is best shown in FIGURE 4, and are firmly engaged against the underside of the float 28 to retain the float in a clamped relation with respect to the horizontal leg portions 31.

In order to pivotally mount the float 28, there is provided a mounting bracket, FIGURES 2 and 5, which is referred to in general by the reference numeral 36. The mounting bracket 36 includes a plate portion 37 having a pair of flanges 38 extending therefrom. The plate portion 37 is provided with an internally threaded bore 39, to facilitate the mounting of the mounting bracket, and the flanges 38 carry a pivot pin 40 which may be in the form of a brass cotter pin, although other types of pins could be used.

The mounting bracket 36 is secured against the inner surface of the end wall 10 of the casing 8 in the manner best illustrated in FIGURE 2. The upper portion of the inner surface of the end wall 10 is provided with a pair of locating tips 41, of which only one is shown in this view. The end wall 10 is also provided with a bore 42 through which a screw 43 may be passed. When it is desired to assemble the float 28, the float support 29, and the mounting bracket 36 within the casing 8 as a unit, the float 28 is first assembled on the float support 29, and then the float support 29 is assembled on the mounting bracket 36 in a manner to be described hereinafter. The entire assembly is then placed within the casing 8 and the upper edge of the plate portion 37 of the mounting bracket 36 is brought into engagement with the lower ends of the locating tips 41. At this time, the bore 42 will be aligned with the threaded bore 39 in the mounting bracket 36, and the screw 43 may be readily passed through the bore 42 and threaded into the threaded bore 39 to quickly and easily secure the mounting bracket 36 in place to support the float support 29 and the float 28 carried thereby.

Reference is made to FIGURE 2 with respect to the mounting of float support 29 with respect to the mounting bracket 36. It is to be noted that the short depending legs 33 of the wires extend with respect to the horizontal leg portions 31 so that the inclusive angle is a large acute angle. As a result, when the float 28 is in a position wherein the entrance opening 27 is closed in the manner to be described hereinafter, the short legs 33 are spaced from the plate portion 37 of the mounting bracket 36, and the pivot pin 40 is disposed within the acute angle formed by the horizontal leg portion 31 and the short depending leg portion 33 of each of the wires 30. When the float 28 drops due to its failure to be supported by water within the watering trough 6, the float support 29 will pivot about the pivot pin 40 until the lower portion of the short depending legs 33 abut against the plate portion 37 of the mounting bracket 36, at which time the downward swinging of the float 28 will be stopped. In this manner, the arcuate travel of the float 28 is restricted, and at the same time, the connection between the float support 29 and the mounting bracket 36 is assured.

The plate 34, FIGURE 5, carries a valve member 44 which is formed of a suitable resilient valve material, such as rubber or a suitable plastic. The valve member 44 is secured to the plate 34 by means of a rivet 45, or the like, which is preferably formed of brass to prevent corrosion. It is to be understood that the rivet 45 does not rigidly clamp the valve member 44 against the plate 34, but holds the valve member 44 firmly while permitting same to be rotated with respect to the plate 34. In this manner, as a portion of the valve member 44 begins to show signs of wear, the valve member 44 may be rotated so that another portion thereof will be aligned with the valve seat 26 of the wall 25.

It will be readily apparent from FIGURE 2 that when the water level within the watering trough 6 reaches the desired level, the upward pressure of the water on the float 28 will result in the upward movement of the float 28 to the position illustrated. When the float 28 is in this position, the valve member 44 is tightly held against the valve seat 26 to close the entrance opening 27. The pressure exerted by the float 28 on the valve member 44 will be sufficient to overcome the pressure of the water in the garden hose 24 and which acts upon the valve member 44 through the entrance opening 27 to prevent the flow of water through said entrance opening into watering trough 6. However, when the level of the water within the trough 6 drops, the float 28 will move downwardly accordingly, and allow additional water to enter into the watering trough 6 through the float valve assembly 7.

It is to be noted that the interior of the casing 8 is vented by means of a vent opening 46, FIGURE 2, which is formed in the top wall 9 thereof. The vent opening 46 prevents the trapping of air within the upper part of the casing 8 above the float 28, which trapped air could possibly interfere with or prevent the proper functioning of the float 28.

A review of the float valve structure will indicate that several advantageous features exist. First, all of the moving structure of the float valve 7 is disposed within the casing 8 and therefore is protected by the latter against damage by the animals, such as horses and cattle, drinking from trough 6. Secondly, all of the means for mounting the float 28 is preferably formed of a non-corrosive metal, and the pivot between the float support 29 and the mounting bracket 36 is an extremely simple and positive one, thereby precluding any possibility of malfunctioning of the float valve. The manner in which the float 28 is attached to the float support 29 is extremely simple, and at the same time provides for a firm and positive connection between the float 28 and the float support 29. The provision of the locating tips 41 of end wall 10, in cooperation with the accurate placement of the bore 42, assures the aligning of the bore 42 with the threaded bore 39 in the mounting bracket 36 so that the entire float and valve assembly may be quickly and readily mounted within the casing 8 utilizing a single screw, such as the screw 43. In summary, the float valve 7 incorporates a novel float and valve structure which is extremely simple, readily assembled, formed of inexpensive materials and is fool-proof in operation.

From the foregoing, it will be seen that novel and advantageous provision has been made for carrying out the desired ends relative to a float valve assembly especially adapted for use in watering troughs. However, attention is directed to the fact that equivalent variations may be made in the example float valve construction disclosed herein, such as using a different form of non-waterloggable float, without departing from the spirit and scope of the invention, as herein shown and described. Directional terms, such as "horizontal," "upper," et cetera, have also been used to facilitate describing the mechanism in the position shown in the drawing, and accordingly are not to be considered as limiting upon the invention.

Other modes of applying the principle of my invention may be employed instead of the one explained, change being made as regards the apparatus herein disclosed, provided the means stated by any of the following claims or the equivalent of such stated means be employed.

I therefore particularly point out and distinctly claim as my invention:

1. In a float valve construction, a float and valve assembly comprising a float casing with top, sides and ends, and an open bottom, a mounting bracket having means for attachment to the inner face of one of said float casing ends, a float support pivotally carried inside said casing by said mounting bracket, a watertight float rigidly carried by said float support remote from said mounting bracket, a valve member carried by said float support adjacent said mounting bracket, said float casing having a top inlet therethrough sealable by said valve member, when said float is in uppermost position, said float support comprising two spaced wires each having a horizontal leg and a short and a long depending leg, both of said long legs passing through said float, and fastening means on said long legs engaging the underside of said float and clamping said float against said horizontal legs, said short legs being pivotally connected to said mounting bracket.

2. The float and valve assembly of claim 1, wherein said wires are connected together by a support for said valve member extending between and secured to said horizontal legs.

3. The float and valve assembly of claim 2, wherein the included angle between each short leg and its respective horizontal leg is an acute angle, and said mounting bracket includes a pivot pin disposed within the angle for pivotally supporting said float support with said short legs hooked thereover.

4. The float and valve assembly of claim 2, wherein the included angle between each short leg and its respective horizontal leg is an acute angle, and said mounting bracket has a pivot pin disposed within said angle for pivotally supporting said float support with said short legs hooked thereover, and wherein said mounting bracket has a plate portion engageable by said short legs to limit downward swinging of said float.

5. The float and valve assembly of claim 1, wherein the included angle between each short leg and its respective horizontal leg is an acute angle, and said mounting bracket includes a pivot pin disposed within said angle for pivotally supporting said float support with said short legs hooked thereover.

6. A float valve construction having a float support in an inverted open bottom, top vented, float casing mountable in an open top tank, comprising a watertight float, at least one wire having a horizontal leg, a short depending leg at one end of said horizontal leg for pivotally mounting said float support, pivot means in said float casing to engage and support said short leg, valve means actuated by said float and support to a closed position, a long depending leg at the other end of said horizontal leg for penetration through said watertight float with said horizontal leg bearing against the upper surface of the float, and means on the end of said long depending leg to hold said horizontal leg against the upper surface of said float.

7. A float valve construction having a float support in an inverted open bottom, top vented, float casing mountable on an open top tank, comprising a watertight float, a pair of spaced parallel wires, each wire having a horizontal leg, a short depending leg at one end of said horizontal leg for pivotally mounting said float support, pivot means in said float casing to engage and support said short legs, and a long depending leg at the other end of said horizontal leg for penetration through said watertight float with said horizontal leg bearing against the upper surface of the float, an inlet means in the top of said casing adjacent one end of same, a valve member actuated by said float and support to a closed position sealing said inlet means, and a mounting plate for said valve member, said mounting plate extending between and secured to said horizontal legs adjacent said short depending legs and in alinement with said top inlet means of said casing.

8. In a float valve construction of the type including a vented float casing having an open bottom and a float valve mounted within said float casing, a float mounting including a mounting bracket and float support all mounted entirely within said casing and secured to said casing at one end thereof by a single fixed position fastener extending through said casing and secured to said mounting bracket, said float valve being mounted on said support adjacent said mounting bracket and said float casing having an inlet in its top closable by said float valve when said float is in uppermost position, said casing having integral locating tips for engagement by said mounting bracket to facilitate alinement and stopping of said mounting bracket with said casing in position to receive said fastener.

9. A float valve construction for watering troughs and the like, which comprises a vented float casing which has a top, ends, and sides, an inlet connection to said casing through said top adjacent one end of same, a valve seat on the inner face of said top and encircling said inlet, a mounting bracket inside of said casing, means for anchoring said bracket wholly inside said casing to the end wall of said casing at the inlet connection end of same, a float support in the form of a pair of spaced apart wire members pivotally carried by and supported on said mounting bracket, a watertight float rigidly carried by said float support, a sealing valve member carried by said float support adjacent said mounting bracket in position to seal on said valve seat and stop flow through said inlet when said float is in its uppermost position, and a mounting plate for said sealing valve member extending between and secured to said pair of spaced apart wire members.

10. A float valve construction for watering troughs as set forth in claim 9, wherein said mounting bracket has a cross pin adjacent the top of same and said float support has spaced apart hooks means for engaging said pin for pivotally supporting said float support on said mounting bracket wholly within said float casing, and wherein said sealing valve member is pivotally mounted on said float support so that said sealing valve can be rotated to present various portions to seal on said valve seat.

References Cited by the Examiner

UNITED STATES PATENTS

| | | | |
|---|---|---|---|
| 1,210,596 | 1/17 | Burt | 137—448 |
| 1,463,907 | 8/23 | Olson | 137—434 |
| 1,572,964 | 2/26 | Sanders | 137—448 XR |
| 2,718,784 | 9/55 | Brake | 73—317 |
| 2,842,158 | 7/58 | Robinson | 137—428 |
| 2,907,845 | 10/59 | Culley | 73—322.5 XR |

FOREIGN PATENTS

| | | |
|---|---|---|
| 631,832 | 1927 | France. |
| 1,127,628 | 1956 | France. |
| 205,858 | 1939 | Switzerland. |

ISADOR WEIL, *Primary Examiner.*